United States Patent [19]

Willen

[11] 3,848,487

[45] Nov. 19, 1974

[54] TOOL HOLDERS FOR MACHINE TOOLS

[76] Inventor: Charles Willen, 14, Route du Stand, 1844 Villeneuve, Switzerland

[22] Filed: Aug. 7, 1973

[21] Appl. No.: 386,297

Related U.S. Application Data

[62] Division of Ser. No. 67,370, Aug. 27, 1970, Pat. No. 3,750,498.

[30] Foreign Application Priority Data

| Aug. 29, 1969 | Switzerland | 13108/69 |
| Aug. 29, 1969 | Switzerland | 13109/69 |
| Aug. 29, 1969 | Switzerland | 13110/69 |
| Aug. 29, 1969 | Switzerland | 13112/69 |

[52] U.S. Cl. ............................ 82/36 R, 82/24 A
[51] Int. Cl. ................................. B23b 29/12
[58] Field of Search .......... 82/36 R, 36 A, 24, 24 A, 82/35; 29/57

[56] References Cited

UNITED STATES PATENTS

| 2,311,211 | 2/1943 | Class | 29/57 X |
| 3,277,753 | 10/1966 | Angst | 82/36 R |
| 3,471,912 | 10/1969 | Johnson | 29/57 |

Primary Examiner—Leonidas Vlachos
Attorney, Agent, or Firm—Robert E. Burns; Emmanuel J. Lobato; Bruce L. Adams

[57] ABSTRACT

A tool holder for machine tools, such as automatic lathes, includes a body for attachment to the turret of the lathe. A tool support is connected to the body and adjusting means is attached to the tool support for adjusting the position of the tool support relative to the body. The adjusting means includes two relatively rotatable parts and roller means between the parts. Tool relief means are fitted to the tool holder.

4 Claims, 4 Drawing Figures

3,848,487

TOOL HOLDERS FOR MACHINE TOOLS

This is a division, of application Ser. No. 67,370, filed Aug. 27, 1970 and now Pat. No. 3,750,498.

BACKGROUND OF THE INVENTION.

The present invention relates to tool holders for machine tools and in particular to tool holders for automatic, semi-automatic, capstan and turret lathes.

Tool holders are known which include tool supports for supporting cutting tools, the tool supports being adjustable in order to position the cutting edge of their respective tool accurately with respect to a workpiece held in the lathe. The means for adjusting the tool supports are often very bulky and limit the space around the tool and consequently access to the tool is limited. Further, with the known tool holders, the means for adjusting the tool supports are limited to only one tool on a turret.

AIMS OF THE PRESENT INVENTION.

An object of the present invention is the provision of a tool holder having a tool support, and means for relievably adjusting the tool support, which adjusting means is easy to manufacture and compact thereby permitting easy access to a cutting tool held by the tool support.

A further object of the present invention is the provision of a tool holder having a tool support, and means for adjusting the tool support, the adjusting means including relatively rotatable parts and roller means between the parts for eliminating or substantially reducing play between the parts without increasing the frictional resistance between the parts.

According to the present invention, a tool holder for machine tools comprises a body having means on one face for attaching the body to a turret of the machine tool, and a tool support relievably attached to the opposite face of the body An automatic tool relief device is provided, the device comprising a tubular sleeve pivotably mounted about its axis in a hole of the body and adapted to support the tool support, and a nut attached to and concentric with the sleeve for pivotal movement therewith, two ball bearings on which the pivoting movement of the sleeve is made, the ball bearings being subject to a stress exerted by operational use of a tool when mounted on the tool support, the play between opposed surfaces of the body and the pivoting sleeve being calculated in such a way as to protect the balls from overload.

DESCRIPTION OF THE FIGURES.

Embodiments of the present invention will now be described, by way of example, with reference to the Figures of the accompanying drawings in which.

DESCRIPTION OF PREFERRED EMBODIMENT.

Figure 1:
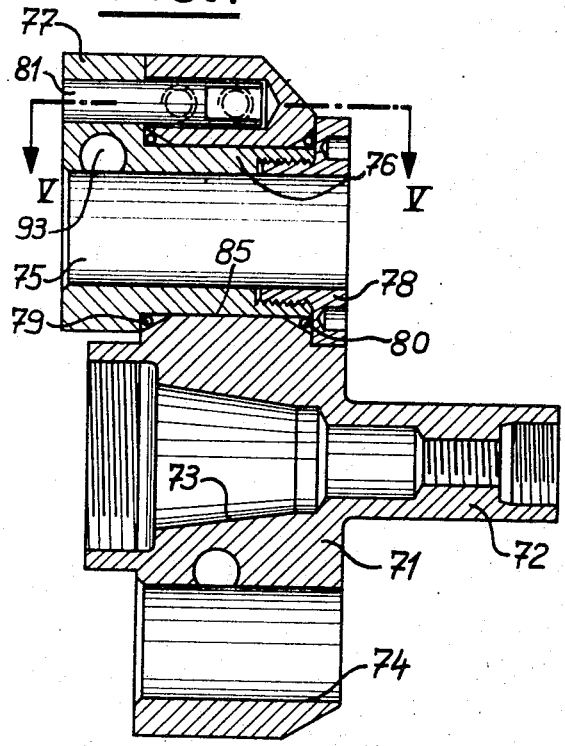
FIG. 1 is a cross-section according to I-I of FIG. 2.
Figure 2:
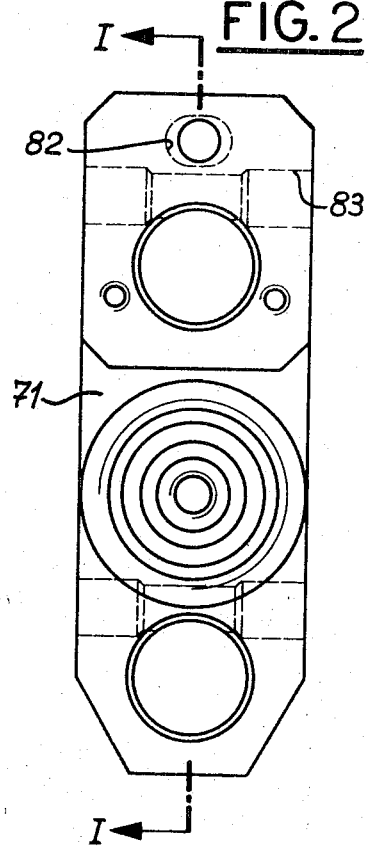
FIG. 2 is an end view of the automatic tool relief device.

The body 71 of the tool holder (FIG. 1) comprises, a hollow shank 72, a central through hole with a tapered portion 73 for housing a conical collet (not shown) and, two holes 74 and 85. Hole 74 is of a known type but hole 85 has a slightly enlarged diameter and receives a tubular sleeve 76 having an internal surface 75, which, as hole 74, is intended to receive the shank of a detachable tool support. The sleeve 76 comprises a flange bearing 77 which is pressed against a surface of the tool holder, and a threaded end into which is screwed a nut 78. The sleeve and nut assembly rotates on two ball bearings 79 and 80 which are placed in two cavities each having a straight triangular section as seen in FIG. 1. For bearing 79, the three surfaces of the race or cavity are defined, on one side by a chamfer made in the body 1 of the tool holder, and on the other side, by two faces of sleeve 76 arranged at right angles to each other. The three surfaces of the ball bearing cavity or race of balls 80 are constituted on one side, by a chamfer made in the body 1 of the tool holder, and on the other side by two faces at right angles on, respectively, the sleeve 76 and nut 78.

The balls are in contact with their race, theoretically at three points, in practice on three sections of the spherical surfaces. This race exercises a certain stress on the balls when the assembly is in the inoperative position, that is, when the cutting tool is not subject to any force. The constraint exersided on the ball, is determined in such a way, that all radial play and/or axial play of the pivoting element is eliminated, and that the resisting couple opposing the rotation of the assembly, remains, nevertheless, minimum. Furthermore, this mounting on ball bearings prevents seizing of the assembly, should the shank of the cutter holder engaged in bore 75 be moved, for example, when the cutting tool is submitted to a considerable force.

Figure 3:
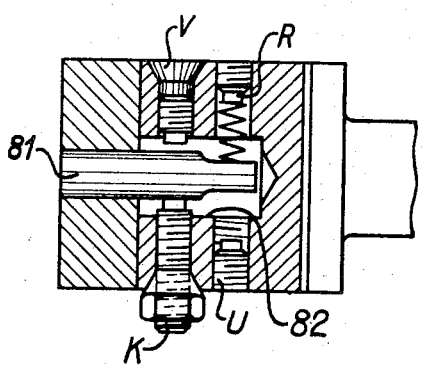
FIG. 3 is a detail of FIG. 1.
Figure 4:
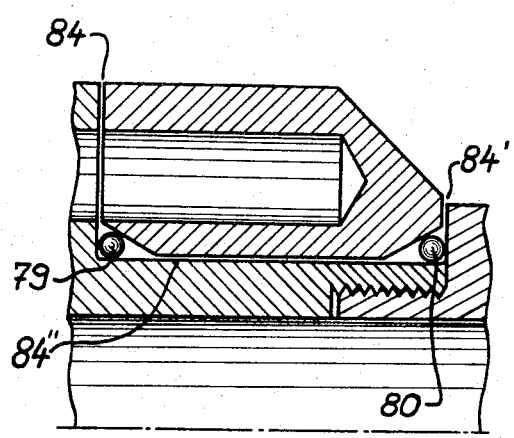
FIG. 4 is a plan cross-section, according to IV—IV of FIG. 1.

A slight clearance 84 (FIG. 3) is made between the opposite faces of the pivoting assembly and the body 1 of the tool holder in such a way as to eliminate friction between them during the rotation of the assembly. This clearance acts as a safety device in case of excessive force; in this case it disappears, as the said opposite surfaces can come into contact as a result, protecting the balls against any overload. The distortion of the balls and their race remains in the limit of elasticity of the material, and consequently, avoids any permanent distortion of their contact surface. As soon as the excessive force ceases, the rolling members take up their position and normal functioning.

A pin 81 is driven into the flange bearing 77 and is engaged in a hole having an oblong cross-section 82 made in the body 1 of the tool holder. The clearance of this tool inside the blind hole 82 is limited by a fixed stop V, and by an adjustable stop K. A biasing spring R abutting against screw R' holds the pin against the stop K in the inoperative position, the tool being found then in its free position Screw U is a blocking screw. It is possible if so desired, to easily change the clearance direction of the tool, by changing screw K and screw V on the one hand, spring R and blocking screw U on the other hand.

Furthermore, screw U is longer than screw K; this enables the user, if necessary, to compress spring R with more force than with screw R'.

A traverse bore 93 is formed in sleeve 7 for inserting a locking rod for locking the shank of the tool support (not shown) which is engaged in the sleeve 76.

What is claimed is:

1. A tool holder comprising a tool holder body and a tool carrying and automatically tool relieving means on said body, said means comprising a tubular sleeve mounted for pivoting movement about its axis in a hole of the body and adapted to carry a tool support, a nut attached to and concentric with an end portion of the sleeve for pivotal movement therewith, means forming parts of said body, sleeve and nut defining conical, cylindrical and planar surfaces, two antifriction bearings on said surfaces, to facilitate the pivoting movement of the sleeve, and means including said nut, for subjecting the bearings to a stress in operational use of a tool mounted on the tool support, play between opposed surfaces of the body and the sleeve being limited to play which protects the bearings from overload.

2. A tool holder according to claim 1 including means forming parts of said sleeve and nut for spacing said planar surfaces from one another to pre-stress said bearings, in compression, prior to the operational use of the tool.

3. A tool holder according to claim 1 including means forming parts of said sleeve and nut for limiting axial distances which separate planar surfaces of the sleeve and nut from adjacent planar surfaces of the tool holder body to distances smaller than an axial shift of the sleeve and nut corresponding to the maximum elastic deformation of the bearings which occurs in the operational use of the tool.

4. A tool holder according to claim 1 wherein said bearings are ball bearings.

* * * * *